Oct. 19, 1943.   J. A. MOREHEAD   2,332,246
METHOD OF MAKING LENSES
Filed May 31, 1939   2 Sheets-Sheet 2
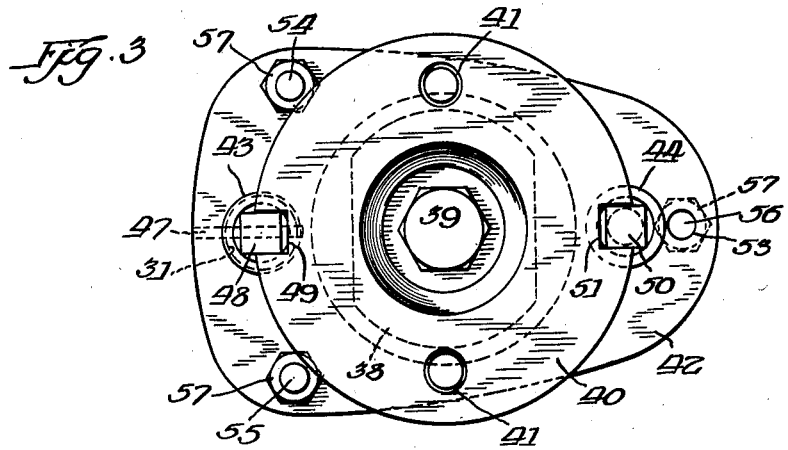
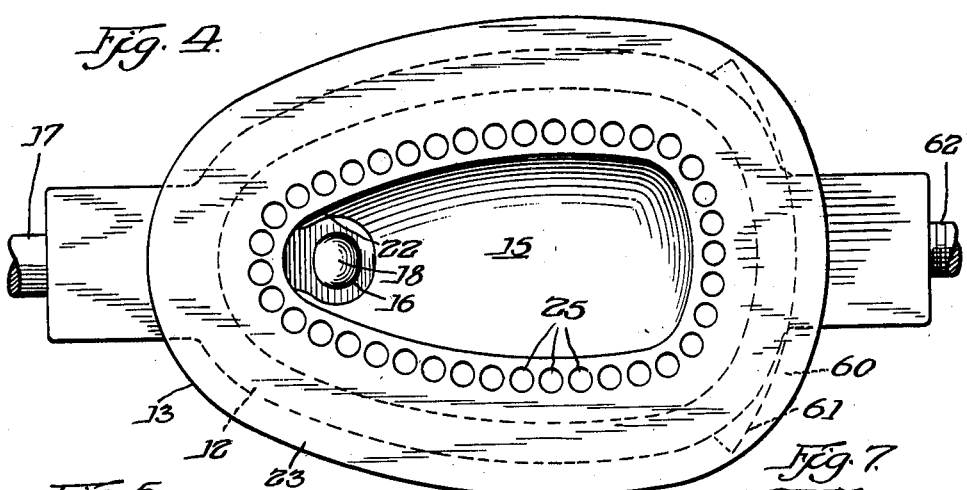
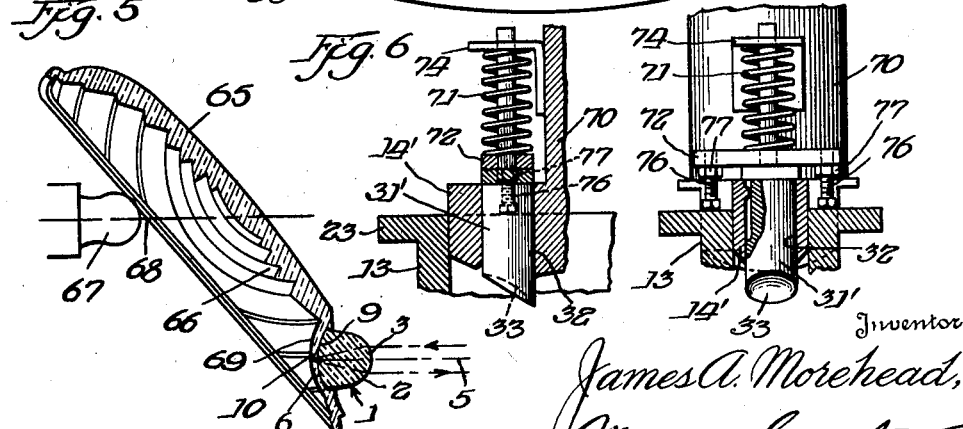

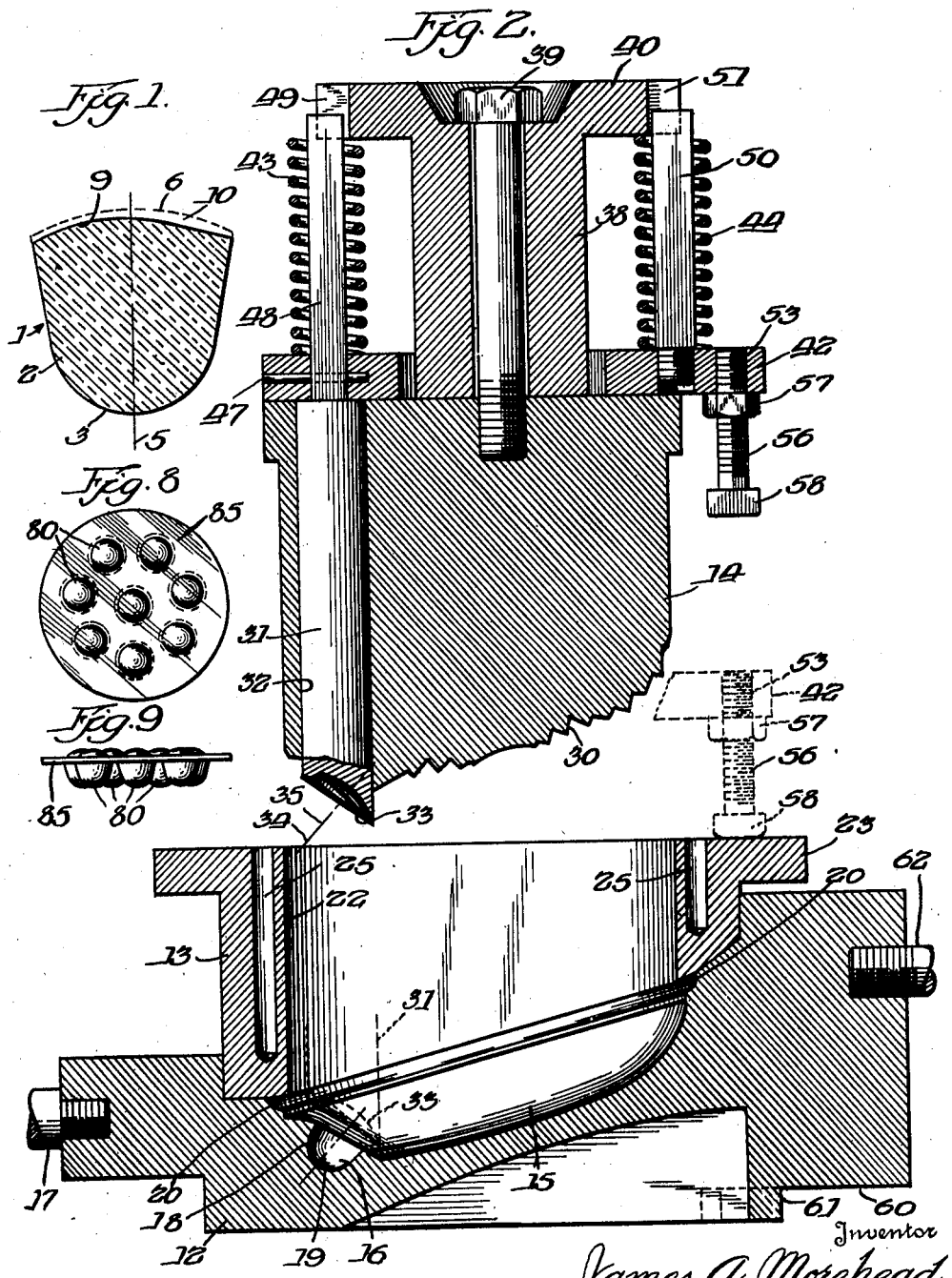

Patented Oct. 19, 1943

2,332,246

UNITED STATES PATENT OFFICE 2,332,246

METHOD OF MAKING LENSES

James A. Morehead, Huntington, W. Va., assignor to Samuel M. Dover, Chicago, Ill.

Application May 31, 1939, Serial No. 276,693

11 Claims. (Cl. 49—79)

This application is a continuation in part of my application, Serial No. 235,685, now Patent No. 2,287,191, issued June 23, 1942.

This invention relates to optical apparatus and method of making the same and, more particularly, to the portion of the optical apparatus which directs rays of light in the desired manner, namely, to the lens.

The present invention is concerned, more specifically, with autocollimating reflectors such as are used, for instance, on highways, and on automobiles or other vehicles. The object of such reflectors is to reflect light from the headlights of an approaching vehicle back towards the source with an amount of spread only sufficient to enable the reflected light to reach the line of vision of the driver of the approaching vehicle even though the light may strike the reflector from various angles within a wide range. With improved highways and consequent higher and higher automobile speeds it becomes more and more necessary to have such reflectors which are capable of reflecting a large amount of light for very great distances in a direction substantially parallel to the incident beam. The legal requirements in many instances are such that the reflected light from the headlights of an approaching vehicle must be of a specified intensity to be clearly visible at a distance of three hundred feet or more. This necessitates a high degree of precision in the curvature of the reflector thereby, of course, increasing the cost of manufacture of the unit.

Consider, by way of example, an autocollimating reflector of the type shown, for instance, in Figure 3 of the patent to Chretien, Reissue No. 19,070. This comprises essentially a block of glass with convex surfaces at its two ends, the radii of the two surfaces being different and of relative lengths as determined by known optic laws, and the centers of curvature both positioned on the same optical axis. Any deviation in the curvature of the reflecting surface will result in a diminution of the reflected light in the desired direction. At a great distance this diminution is so great as to render the reflector unsatisfactory, even though the deviation from the correct curvature is very very small.

In the manufacture of a comparatively large reflecting button of the type referred to above, such as is necessary where a large amount of reflected light is required, the shrinkage or other distortion of the large mass of molten glass before it solidifies is sufficient to cause such a degree of inaccuracy in the curvature of one or more of the lens surfaces as to render the button useless in most instances, unless it is subjected to grinding or other operations to bring it to the requisite curvature. This defect becomes more and more serious as the size of the reflector button being manufactured is increased. It is one of the objects of the present invention to provide a method of making large reflector buttons of the above mentioned character, in two stages, the first stage of which aims to form the reflecting surface, or the surface which becomes distorted, to approximately but not necessarily of quite the requisite shape, said surface having less glass than required rather than more glass. Therefore the surface must be built up to the requisite shape instead of having to be ground down to the requisite shape. This unit, when quite hot but still solid, is placed in a mold and a layer of molten glass placed over it. A die then presses the layer of molten glass to the requisite shape so that the newly added glass forms a thin film which is fused to the previously formed reflector button and forms an integral part thereof. Upon retraction of the die, or cooling of the thin film of glass, the total amount of molten glass that is subject to change in shape is so slight that the change in shape of the finished reflecting surface is negligible and the surface cools to substantially the shape to which it has been molded by the die.

Reflector buttons that are to reflect light indicative of danger should be of a red color, since red is the accepted color for indicating danger. Red glass necessarily absorbs a good deal more light than clear transparent glass absorbs, hence a red reflector button is less efficient than is a clear glass reflector button. The efficiency diminishes as the thickness of the button and intensity of the colored glass is increased. On large reflector buttons where there is an appreciable thickness of glass this absorption of light within the glass reflector button becomes appreciable. I have discovered a way of making an autocollimating reflector of the above character which will have light absorption characteristics not appreciably different from those of a clear glass reflector and yet will reflect red (or any other desired color). This is accomplished by forming the reflector button of clear glass and then molding a thin film-like layer of colored glass over the back reflecting surface thereof. This thin layer imparts the necessary color to the reflected light and, because of its extreme thinness, absorbs substantially no light. The clear glass reflector button may be molded to a curvature approximately but not quite the requisite shape, the difference requiring a building up of the glass rather than grinding down of the same, and the colored glass may constitute the film which builds up this approximately correctly shaped curve to the correct degree of accuracy of curvature.

It is a further object of the present invention to provide an improved process of making an automobile stop or tail light lens or cover glass, particularly of such a lens that is provided with an autocollimating reflector. The reflector button may be cast or otherwise formed with its reflecting surface of approximately but not quite the requisite shape and that button then placed in a mold and a body of molten glass molded around the same to form the rest of the automobile stop or tail light lens and during that molding operation the thin film of glass required for bringing the reflector button curvature to the requisite shape may be molded in place.

The attainment of the above and further objects of the present invention will be apparent from the following specification taken in conjunction with the accompanying drawings forming a part thereof:

In the drawings:

Figure 1 is a sectional view of a reflector insert to be molded into an automobile tail lamp lens;

Figure 2 is a longitudinal sectional view through a die embodying the present invention;

Figure 3 is a plan view of the die of Figure 2;

Figure 4 is a top view of the ring and mold of the die of Figure 2;

Figure 5 is a sectional view through a lens formed by the die of Figure 2;

Figures 6 and 7 are fragmentary sectional views at right angles to one another of another die; and Figures 8 and 9 are plan and side views of another pressed glass object made in accordance with this invention.

In the accompanying specification I speak of the lens as being made of glass. The substance "glass" is chosen for illustrative purposes only and it is to be understood that this term is being used in its broadest sense to include any plastic or moldable light transmitting material.

In the construction of autocollimating reflector buttons such as are shown, for instance, in Figure 3 of the patent to Chretien, Reissue No. 19,070, or as shown in my pending application Serial No. 235,685, now Patent No. 2,287,191, issued June 23, 1942, it is essential that opposite curved surfaces of the reflector should be of exactly the requisite radius of curvature and the requisite distance apart. Consider, by way of example, an autocollimating reflector button a cross section of which is shown in Figure 1. The reflector button 1 consists of a body of glass 2 circular in cross section throughout. This button must be so constructed that it will reflect light in the form of a beam substantially parallel to an incident beam from varying angles, but with a very slight spread. For this purpose it is essential that the spherical surface 3 should have its center along the optical axis 5 and that the opposite spherical surface, indicated by the dotted line 6, should also have its center on the same optical axis 5 but be of a different radius than that of the surface 3. It is essential that the distance between the surfaces 3 and 6 should be a predetermined amount. In making this reflector by pressing molten glass between a pair of dies in a single operation it is exceedingly difficult to obtain the curvatures 3 and 6 exactly as required. To obviate this difficulty the reflector button 1 is therefore made so that the surface 3 is of the exactly required curvature and the top surface 9 is of approximately but not necessarily the requisite curvature. The button 1 may be made in any desired manner, as by molding or pressing, or in any other way. The space between the dotted line 6 and the full line 9 represents the extent to which the back surface 9 of the cast reflector button deviates from the ultimately requisite surface. In accordance with the teachings of the present invention a thin layer of glass 10 is then pressed over the surface 9 in such a way that the added glass 10 fuses with the body of glass 2 into one integral structure. Any shrinkage of the fused glass 10 may cause the surface 6 to deviate a slight amount from the surface of the die used in forming the surface 6 but, because the layer of glass 10 is very thin, from a few thousandths of an inch to a thickness of the order of a few tenths of an inch, the total shrinkage will necessarily be so very small as not to affect the accuracy of the ultimate lens. The body of glass 2 may be glass of one kind as, for instance, crystal clear glass, and the glass layer 10 may be of a different color as, for instance, amber or ruby colored glass, so that white light striking the surface 3 and passing through the reflector and then back out again at the surface 3 will be of the requisite color. After completion of the glass part of the lens the surface 6 is silvered to facilitate the reflection of light through the lens.

An explanation will now be given of the construction of the dies for forming a lens of which the precast button 1 is a part, the layer of glass 10 being formed on the precast button 1 during the process of forming of the rest of the lens. The die comprises a mold 12 adapted to receive a ring 13 and a plunger 14 mounted in a press (not shown) and arranged to be moved down into the ring 13 to press the lens to the requisite shape. The mold 12 is made of cast iron or the like and includes a cavity 15 having the shape of the exterior of the ultimately finished automobile lens to be made, and it also includes a cavity 16 of exactly the requisite shape to receive the reflector button 1 and hold the same snugly. A precast reflector button 1 can be placed in the cavity 16 with the surface 3 of the reflector button resting on the similarly curved surface 18 of the cavity 16, and the axis 19 of the cavity 16 coinciding exactly with the axis 5 of the button. It is to be noted that the cavity 15 in the mold 12 and the cavity 16 thereof are at such an angle to the horizontal that the ultimately cast lens is in a slightly inclined position in the mold. This facilitates the flow of the molten glass under the pressing action of the plunger or male die, as will be more fully described. The mold 12 has a handle 17 secured thereto to facilitate handling of the mold.

The mold cavity 15 includes a portion 20 adapted to form a peripherally extending rim around the lens.

The ring 13 fits snugly into the mold 12. A portion of the ring 13 overlies the rim forming space 20 so that the ring 13 prevents the plunger from drawing the cast lens up with it when the plunger recedes from the mold 12 at the completion of a pressing operation. The ring 13 has an opening 22 therein of exactly the same contour as that of the plunger 14 so that the plunger slides smoothly through the ring 13. The ring has a peripherally extending flange 23 to facilitate removal of the ring from the mold and reinsertion thereof into the mold. This flange 23 also has the additional function of acting as a stop for a part of the male die or plunger 14 as will be more fully set forth as this description proceeds. The ring 13 has a large number of small holes 25 formed therein around the opening 22 so that the thickness of metal from the surface 22 to the holes 25 is quite small. This reduces the heat storage capacity of the ring and inhibits the flow of heat from the surface 22 into the body of metal of the ring 13. The surface 22 therefore remains hotter than it would without the holes, and therefore has a lesser cooling effect on the glass.

The die or plunger 14 has a pressing face 30 shaped to form the interior of the lens to the requisite shape, illustrated more fully in Figure 5, and it also has an additional plunger 31 slidable in a bore 32 at one end of the plunger 14. The plunger 31 has a spherically curved surface 33 at its lower end, said surface having its center at 34 on the axis indicated by the line 35.

The plunger 14 is secured to a head 38 by a centrally located bolt 39 that threads into the body of the plunger 14. The head 38 has a flange 40 having a pair of threaded holes 41—41 for mounting the head on the vertically movable part of a glass press. A ring 42 embraces the head 38 and rests upon the top of the plunger 14, being pressed towards the top of the plunger 14 by two powerful springs 43—44 that bear at their lower ends against the ring 42 and at their upper ends against the peripherally extending flange 40 on the head 38. The plunger 31 is rigidly connected to the ring 42 in any desired manner, as by a pin 47 that extends through the ring and through an extension 48 which is an integral part of the plunger 31. The top of the extension 48 is guided in a slot 49 formed in the flange 40. A pin 50 is threaded at its lower end into the ring 42 and is embraced by the spring 44 and is guided at its upper end in a slot 51 in the flange 40.

The ring 42 has three similarly tapped holes 53, through which bolts 54, 55 and 56 are threaded, and locked in position by lock nuts 57 so that the heads 58 of all of the bolts are the same predetermined fixed distance from the ring 41. The lock nut 57 on the bolt 56 is below the ring 42 since this bolt is adjacent the pin 50. The lock nuts 57 for the bolts 54 and 55 may be on the top surface of the ring 42 since those holes are spaced from the portion 48 of the plunger 31, as may be seen from Figure 3.

An explanation will now be given of the manner of forming a lens in accordance with the present invention. A precast or pressed glass button 1, of the shape illustrated in Figure 1, and having a top curved surface 9 approximately but not exactly of the requisite curvature 6 is first formed. The surface 9 is at such a distance from the surface 3 that it has to be built up to the requisite surface 6 rather than be ground to the surface 6. The preformed glass button 1, is heated to a temperature below that at which softening of the glass takes place, but sufficiently high to permit fusion of the button with the rest of the lens to be formed and to avoid cracking or unduly straining the glass of the button or the glass to be formed adjacent thereto and fused thereto. The button 1 is then placed in the cavity 16 of the mold 12, with the surface 3 of the button lowermost. The mold may be and preferably is preheated, but this is not indispensable. Thereafter a mass of molten glass in an amount sufficient to form the lens is placed into the mold cavity 15. It is desirable that the elevated temperature of the button 2 be as low as possible but sufficiently high to avoid cracking as the mass of molten glass comes in contact therewith and upon the subsequent solidification and cooling of the molten mass. The ring 13 is then placed in the mold 12, in the position illustrated in Figure 2. The mold is then placed in the press. In order to center the mold in the press the bottom of the mold is recessed at 60 and is provided with a circular curved surface 61 which fits an oppositely curved or concave-faced plate in the press. A bolt 62 extending from the mold is brought against a stop in the press, thus definitely centering the mold in the press. The plunger 14 is then lowered, first into the ring and then into the mold 12. The plunger descends as a unit until the heads 58 of the bolts abut against flange 23 of the ring 13, as indicated in dotted lines in Figure 2. When the plunger reaches this position the surface 33 of the plunger 31 is in the exact position for forming the surface 6 of the button. At that time the axis 35 of the spherical curve 33 coincides with the axis 19 of the spherical curve 18, and the curved surface 33 is at exactly the correct distance from the curved surface 18. This places the curved surface 33 at a very slight distance from the curved surface 9. This distance may be anywhere from a few hundredths of an inch to a few tenths of an inch. The molten glass on the surface 9 of the button 1 is thus pressed to the requisite shape by the plunger 31. It is, however, not indispensable that the molten glass be on the button 1 at the time the plunger 31 reaches its lowermost position, although that is the preferred condition. The press operator continues lowering the plunger 14, the plunger 31 at this time remaining stationary, until he feels the proper amount of back pressure resisting further downward movement of the plunger 14. The plunger 14 in its descent has pressed the mass of molten glass to the requisite shape and if there was no glass initially between the surface 33 of the plunger 31 and the surface 9 of the button 1 the further descent of the plunger 14 forces the molten glass into the space between the plunger 31 and the button 1. The glass is thus pressed into the requisite shape. In thus forming the lens it is not essential that the amount of molten glass placed in the mold should be determined with extreme precision. Any slightly greater or lesser amount of molten glass placed in the mold 15 will result in a slightly thicker or thinner lens body but can not affect the thickness of the button between the surface 3 and the surface 6. During the pressing of the glass the springs 43—44 exert sufficient pressure upon the plate 42 and thus upon the plunger 31 to prevent the pressure of the glass from forcing the plunger 31 upwardly.

The molten glass fuses with the precast glass button 1 to form one integral structure. The lens thus formed is illustrated in Figure 5. It comprises a body of red glass 65 having the clear glass insert 1 molded therein and united to the main body of red glass by the thin layer of glass 10. Fresnel rings 66 are formed in the glass body 65 so that light from an electric light bulb 67, which is located on the optical axis 68, will emanate from the lens 65 in a substantially horizontal direction. The axis 5 of the button 1 is horizontal when the lens is mounted in its normal position, as illustrated in Figure 5. A layer of silvering material 68 is formed on the back of the lens 65 at the insert 1 to reflect light forward of the lens of Figure 5. A ray of light striking the button 1 from any angle within prescribed limits will pass through the button, through the layer of glass 10, to the mirror reflecting surface 69. From the surface 69 the ray of light will be reflected back through the layer of glass 10 and the button 1 to emanate from the button in a direction substantially parallel to the incident beam but with a very slight spread. The light from the headlights of an approaching automobile will be reflected back by the reflecting surface 69 with sufficient spread to reach the eyes of the driver of the approaching automobile. The back of the mirror reflecting surface 69 may be coated with a paint, such as aluminum paint, or other preservative to protect the mirror reflecting surface.

The mold 15 is formed with the button receiving cavity 16 at a substantial angle to the vertical. This is due to the fact that the lens is adapted to be mounted at an angle to the vertical and it is necessary that the axis 5 of the button be horizontal. If the lens of Figure 5 were to be molded in such a position that the axis 19 of the cavity 16 is vertical then there would be considerable difficulty in pressing the glass upwardly from the lowermost part of the cavity. On the other hand, if the mold cavity 15 of the mold had been formed in a position rotated in a clockwise direction from that shown there would be difficulty in forming the Fresnel projection 66.

While I have here described a set of dies and a process for making a lens having a single reflecting button, it is to be understood that the principles of the present invention are applicable to the manufacture of a lens having a plurality of reflector buttons. In that case the mold 12 would have a plurality of cavities corresponding to 16, each for receiving a precast reflector button, and the plunger 14 would have a plurality of individually movable plungers 31, one for each reflector button. All the plungers 31 may be secured to the stop plate 42 or each plunger may be provided with an individual stop to limit its downward movement into the mold. Thereafter the continued downward movement of the plunger 14 presses the molten glass into the spaces between the precast buttons and the curved surfaces 33 of the respective plungers 31.

In Figures 6 and 7 I have shown a fragmentary portion of a male die or plunger of a construction somewhat different from that of Figure 1. In this construction the plunger 14', which corresponds to the plunger 14 of Figure 2, includes a cylindrical part 70 integral therewith for mounting the plunger in a glass press in the same manner as in Figure 2. The plunger 31', which corresponds to the plunger 31 of Figure 2, slides in the bore 32 of the plunger 14', being pressed downwardly by a very powerful spring 71 that bears at its lower end against a plate 72 that is secured to the plunger 31' and at its upper end against an L-shaped bracket 74 that is suitably secured to the cylindrical part 70 of the plunger 14'. The plate 72 has a pair of stop bolts 76—76 threaded therethrough and locked in position by lock nuts 77 so that the heads of the bolts 76 constitute adjustable stops in exactly the same manner as do the heads 58 of the nuts 54, 55 and 56 in the embodiment previously described. Upon descent of the plunger 14', and with it the plunger 31', into the ring 13 of the mold 12 of Figure 2, the heads of the bolts 76 ultimately engage the flange 23 of the ring and thus limit further descent of the plunger 31'. As the plunger 14' continues to descend, the plunger 31' remains stationary, the plunger 14' sliding on the plunger 31'. The plunger 14' presses the glass to the requisite shape while the plunger 31 forms the thin layer of glass 10 (Figs. 1 and 5) to exactly the requisite shape and at exactly the requisite distance from the surface 3 of the precast glass button 1. In other respects this die and the pressing operation are the same as in the embodiment previously described.

In Figures 8 and 9 I have shown, diagrammatically, a cast glass reflector having a plurality of buttons as an integral part thereof. The buttons are indicated by the reference numerals 80. This reflector unit may be formed by placing a plurality of buttons, in this instance eight, into suitably formed cavities in a mold and then placing a body of molten glass into the mold, in the manner above set forth and molding the thin surfacing layer 10 (Fig. 1) over the bodies by means of a plunger corresponding to the plunger 14, which plunger has eight movable plungers therein corresponding to the plunger 31. These eight movable plungers may have individual stops for fixing their lowermost position with respect to the female mold part, or the eight plungers may be locked together by a plate corresponding to the plate 42, which is in turn provided with stops for limiting the descent of the plate with respect to the mold. In this construction the button receiving cavities in the mold, corresponding to the cavities 16, are formed in the mold with their axes, corresponding to the axis 19 of Figure 2, vertical. The corresponding axes 35 of the respective plungers forming the layers 10 are therefore also vertical and in alignment with the axes of the button cavity in the female or mold part. When the molten glass is pressed around the buttons a body of glass 85, which is of the material of the glass 10, is formed which is fused to and connects the respective buttons. If it is desired to make the surface 9 approach more closely the requisite surface 6, the molded article may be left in the mold to solidify and partially cool and then an additional layer of molten glass may be pressed over the same. Thereafter the back surfaces 6 of the respective buttons may be silvered to facilitate light reflection.

The process outlined above for the manufacture of the reflector body of Figures 8 and 9 may be used for forming the buttons 1. In this process no precast buttons are placed into the button receiving cavities. Instead a mass of molten glass is placed in the mold and a plunger 14 with its individually movable plungers 31 is brought down upon the mass of molten glass. The quantity of glass placed in the mold is such that the overflow from the buttons, represented by the thickness of glass at 85, would be very small. The resulting product would be a series of buttons such as illustrated in Figure 1, joined by a thin fin of glass 85. The buttons may then be broken away from the fin to provide the individual buttons for use in the mold of Figure 2, or for such other use as may be desired.

From the above description it is apparent that the principles of the present invention may be applied to the manufacture of glassware wherever it is desired to make an article of pressed glass having a fixed and predetermined thickness at any determined place or places. If an article of that type is molded by a die such as is illustrated in Figure 2, with or without a precast insert, the body of glass opposite the movable plunger 31 will be of a thickness as desired even though a greater or lesser amount of molten glass may have been placed in the mold by the operator. If a slightly greater amount of glass is used the overflow material will result in a thicker body of pressed glass without increasing the thickness of the glass opposite the plunger 31. Likewise if a slightly lesser amount of glass is placed in the mold the resulting product will be somewhat thinner throughout, except at the place where the plunger 31 engages the body of glass. Furthermore, the main plunger 14 presses the molten glass into intimate engagement with the surface of the plunger 31 so that the surface of the glass at that place is of the shape exactly as determined by the shape of the plunger, allowing for deviations as the glass shrinks from the plunger upon cooling.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. The method of making a lamp lens for transmitting light of a danger-indicating color and for reflecting incident light in the general direction of the light source but with a slight spread and imparting the danger-indicating color to the reflected light, which method comprises, forming an autocollimating lens part insert of colorless lens forming material with one surface thereof of the requisite curvature and the opposite surface of not quite the necessary location for autocollimating reflection, the deviation being one of under-size, placing said formed part in a mold, then molding colored light transmitting lens-forming material around said preformed part to constitute the light-transmitting portion of the lens and in said molding operation forming a layer of said colored lens-forming material over said opposite surface to bring said opposite surface to exactly the requisite shape and location with respect to said one first mentioned surface, said layer being formed of a thickness less than the average thickness of the light transmitting portion of the lens so that the colored layer will impart the requisite danger indicating color to reflected light passing through the clear glass insert.

2. The method of making a lens for transmitting light of a danger indicating color and for reflecting incident light in the general direction of the light source but with a slight spread and imparting the danger indicating color to the reflected light, which method comprises forming a block of transparent lens-forming material with one surface thereof of the requisite curvature to form the reflecting portion of the lens and with the opposite surface deviating from the necessary shape and location for autocollimating reflection, the deviation being one of undersize, placing said block in a mold with its accurately formed surface in engagement with the mold wall and its opposite surface in the mold cavity, placing a mass of molten glass of a danger indicating color in said mold cavity, bringing a molding plunger into a position spaced from and opposite to said opposite surface of the block and pressing molten glass between the block and the plunger to build up the said opposite surface to the requisite shape and distance from the first mentioned surface of the block to reflect incident light in the general direction of the light source but with a slight spread.

3. The method of making a lamp lens for transmitting light of a danger indicating color and for reflecting incident light in the general direction of the light source but with a slight spread and imparting the danger indicating color to the reflected light, which method comprises forming a block of transparent lens-forming material with one surface thereof of the requisite curvature to form the reflecting portion of the lens and with the opposite surface deviating from the necessary shape and location for autocollimating reflection, the deviation being one of undersize, placing said block in a mold with its accurately formed surface in engagement with the mold wall and its opposite surface in the mold cavity, placing a mass of molten glass of a danger indicating color in said mold cavity, bringing a molding plunger into a position spaced from and opposite to said opposite surface of the block, bringing another plunger into pressure engagement with the molten glass and by pressure on said other plunger pressing molten glass between the block and the plunger to build up the said opposite surface to the requisite shape and distance from the first mentioned surface of the block to reflect incident light in the general direction of the light source but with a slight spread, and simultaneously pressing the rest of the mass of molten glass into the shape of a light transmitting lamp lens.

4. The method of making a lamp lens for transmitting light of a danger indicating color and for reflecting incident light in the general direction of the light source but with a slight spread and imparting the danger indicating color to the reflected light, which method comprises forming a block of transparent lens-forming material with one surface thereof of the requisite curvature to form the reflecting portion of the lens and with the opposite surface deviating from the necessary shape and location for autocollimating reflection, the deviation being one of undersize, placing said block in a mold with its accurately formed surface in engagement with the mold wall and its opposite surface in the mold cavity, placing a mass of molten glass of a danger indicating color in said mold cavity, bringing a molding plunger into a position spaced from and opposite to said opposite surface of the block, and pressing molten glass between the block and the plunger to build up the said opposite surface to the requisite shape and distance from the first mentioned surface of the block to reflect incident light in the general direction of the light source but with a slight spread, and simultaneously pressing the rest of the mass of molten glass into the shape of a light transmitting lamp lens.

5. The method of making a lens which comprises forming a button lens part of transparent glass with one surface thereof of the requisite curvature and with the opposite surface closer to said curved surface than is necessary for autocollimating reflection, placing said button in a mold with said one surface in engagement with the mold wall, placing in said mold a mass of molten glass, bringing a molding plunger into position opposite to and accurately spaced from said one surface and bringing another plunger into pressure engagement with the mass of colored glass to press the molten glass between the button and the first plunger to mold a layer of molten glass over the button to bring the second mentioned surface of the lens to the requisite curvature a relative distance from the first surface.

6. The method of making a lens which comprises forming a part of the lens with at least one optical surface of the shape it is to have in the finished lens, placing said preformed part in a mold, then molding the rest of the lens around said preformed part with the preformed part extending almost but not quite through the said subsequently molded part, and in the molding operation fusing a layer of the molding material over a surface of the first lens part opposite the said first mentioned optical surface and in the molding operation mechanically shaping the outside of said layer to the requisite surface shape and position it is to have in the ultimate lens by pressing a plunger into engagement with the outer surface of said layer and maintaining the pressing surface of the plunger at a fixed distance from said first mentioned optical surface.

7. The method of making a lens for transmitting light of a danger indicating color and for reflecting incident light in the general direction of the light source but with a slight spread and imparting the danger indicating color to the reflected light, which method comprises forming a block of transparent lens-forming material with one surface thereof of the requisite curvature to form the reflecting portion of the lens and with the opposite surface deviating from the necessary shape and location for auto-collimating reflection, the deviation being one of undersize, placing said block in a mold with its accurately formed surface in engagement with the mold wall and its opposite surface in the mold cavity, placing a mass of molten glass of a danger indicating color on said block and in an amount in excess of that required to build said undersized block up to its required size, bringing a molding plunger into a fixed position spaced from and opposite to said opposite surface of the block and pressing a part of the molten glass between the block and the plunger to build up the said opposite surface to the requisite shape and distance from the first mentioned surface of the block to reflect incident light in the general direction of the light source but with a slight spread, and pressing the excess molten glass out from between the block and the plunger.

8. The method of making a lamp lens for transmitting light of a danger indicating color and for reflecting incident light in the general direction of the light source but with a slight spread and imparting the danger indicating color to the reflected light, which method comprises forming a block of transparent lens-forming material with one surface thereof of the requisite curvature to form the reflecting portion of the lens and with the opposite surface deviating from the necessary shape and location for autocollimating reflection, the deviation being one of undersize, placing said block in a mold with its accurately formed surface in engagement with the mold wall and its opposite surface in the mold cavity, placing a mass of molten glass of a danger indicating color in said mold cavity and in an amount in excess of that required to build said undersized block up to its required size, bringing a molding plunger into a fixed position spaced from and opposite to said opposite surface of the block, bringing another plunger into pressure engagement with the molten glass and by pressure on said other plunger pressing a part of said mass of molten glass between the block and the plunger to build up the said opposite surface to the requisite shape and distance from the first mentioned surface of the block to reflect incident light in the general direction of the light source but with a slight spread, and simultaneously pressing the rest of the mass of molten glass into the shape of a light transmitting lamp lens.

9. The method of making a lamp lens for transmitting light of a danger indicating color and for reflecting incident light in the general direction of the light source but with a slight spread and imparting the danger indicating color to the reflected light, which method comprises forming a block of transparent lens-forming material with one surface thereof of the requisite curvature to form the reflecting portion of the lens and with the opposite surface deviating from the necessary shape and location for autocollimating reflection, the deviation being one of undersize, placing said block in a mold with its accurately formed surface in engagement with the mold wall and its opposite surface in the mold cavity, placing a mass of molten glass of a danger indicating color in said mold cavity and in an amount in excess of that required to build said undersized block up to its required size, bringing a molding plunger into a fixed position spaced from and opposite to said opposite surface of the block, and pressing a part of the molten glass between the block and the plunger to build up the said opposite surface exactly to the requisite shape and distance from the first mentioned surface of the block to reflect incident light in the general direction of the light source but with a slight spread, and simultaneously pressing the rest of the mass of molten glass into the shape of a light transmitting lamp lens.

10. The method of making a lens which comprises forming a button lens part of transparent glass with one surface thereof of the requisite curvature and with the opposite surface closer to said curved surface than is necessary for autocollimating reflection, placing said button in a mold with said one surface in engagement with the mold wall, placing a mass of molten glass on said button, bringing a molding plunger into position opposite to and accurately spaced from said one surface and bringing another plunger into pressure engagement with the mass of colored glass to press a part of the molten glass between the button and the first plunger to mold a layer of molten glass over the button to bring the second mentioned surface of the lens to the requisite curvature a relative distance from the first surface.

11. The method of making a lens with the opposite surfaces of one part thereof molded to the requisite shape and distance apart with a higher amount of precision than the rest of the lens, which method comprises placing moldable lens forming material into a mold, bringing a molding plunger into a position opposite to and accurately spaced from that part of the mold that is to shape the first mentioned part of the lens, bringing another plunger towards the mold and into molding pressing engagement with the mass of molding material in the mold to shape the rest of the lens and to press the molding material firmly into all the space between the mold and the first mentioned plunger.

JAMES A. MOREHEAD.